US005697236A

United States Patent [19]

Kleefeldt et al.

[11] Patent Number: 5,697,236

[45] Date of Patent: Dec. 16, 1997

[54] MOTOR-VEHICLE DOOR LATCH FOR REMOTE ACTUATION

[75] Inventors: Frank Kleefeldt, Heiligenhaus; Johannes-Theodor Menke, Velbert, both of Germany

[73] Assignee: Kiekert AG, Heiligenhaus, Germany

[21] Appl. No.: 587,662

[22] Filed: Jan. 17, 1996

[30] Foreign Application Priority Data

Jan. 19, 1995 [DE] Germany ........................ 195 01 493.6

[51] Int. Cl.[6] ........................ E05B 65/12; B60R 25/04

[52] U.S. Cl. ........................ 70/257; 70/264; 70/262; 292/336.3; 292/201

[58] Field of Search ........................ 70/256, 257, 262, 70/263, 264, 277, 278, 279; 292/336.3, 201

[56] References Cited

U.S. PATENT DOCUMENTS

| | | | |
|---|---|---|---|
| 3,751,950 | 8/1973 | Leger et al. | 70/264 |
| 4,554,808 | 11/1985 | Escaravage | 70/279 |
| 4,802,350 | 2/1989 | Periou | 70/264 |
| 4,827,744 | 5/1989 | Namazue et al. | 70/263 |
| 4,895,009 | 1/1990 | Kleefeldt et al. | 70/264 |
| 4,974,886 | 12/1990 | Kleefeldt et al. | 70/264 |
| 5,240,296 | 8/1993 | Kobayashi | 292/336.3 |
| 5,497,641 | 3/1996 | Linde et al. | 70/264 |

FOREIGN PATENT DOCUMENTS

| | | | |
|---|---|---|---|
| 1263923 | 12/1989 | Canada | 292/336.3 |
| 0430732 | 6/1991 | European Pat. Off. | 70/256 |
| 2469309 | 5/1981 | France | 70/264 |
| 2911630 | 10/1980 | Germany | 70/264 |
| 86 21 592 | 11/1986 | Germany . | |
| 0164989 | 6/1990 | Japan | 70/256 |
| 4038247 | 2/1992 | Japan | 70/256 |
| 2034802 | 6/1980 | United Kingdom | 70/263 |
| 2161854 | 1/1986 | United Kingdom | 70/256 |
| 2240583 | 8/1991 | United Kingdom | 292/336.3 |
| 92002911 | 2/1992 | WIPO | 70/256 |

*Primary Examiner*—Darnell M. Boucher

*Attorney, Agent, or Firm*—Herbert Dubno; Andrew Wilford

[57] ABSTRACT

A motor-vehicle door latch has a pivotal fork and a latch element interfittable in a latched position and disengageable from each other in an unlatched position, a latch pawl engageable in a holding position with the fork to retain same in the latched position and disengageable in a releasing position from the fork to allow the fork to move into the unlatched position, and a pawl-actuating lever coupled to the pawl for displacing same between its holding and releasing positions. An inside actuating element and an outside lock cylinder can each displace the pawl between its positions. An actuator connected to the lever and electrically energizable from a rest position to an energized position displaces the pawl from its holding to its releasing position. A bistable relay having an input connected to a vehicular power supply and an output is displaceable between a closed position connecting its input and output together and an open position electrically disconnecting its output from its input. An outside actuating switch between the relay output and the actuator closes for electrically energizing the actuator from the power source in the closed position of the relay. A receiver is connected to the relay for displacing same into the closed position on receiving a predetermined signal from a remote transmitter.

10 Claims, 3 Drawing Sheets

MOTOR-VEHICLE DOOR LATCH FOR REMOTE ACTUATION

FIELD OF THE INVENTION

The present invention relates to a motor-vehicle door latch. More particularly this invention concerns such a latch that is specifically built for use with remote actuation, either by a remote transmitter or a central lock system.

BACKGROUND OF THE INVENTION

A standard motor-vehicle door latch comprises a pivotal fork and latch element, one on the door and the other on the door post, that can interfit in a latched position of the door and that disengage for unlatching the door. Typically a latch pawl directly engages the fork and can retain it in the latched position, and often also in a semilatched position. For operation from inside the vehicle, an inside actuating element, typically a simple handle, is mechanically connected to a lever which in turn is coupled to the pawl to actuate same.

Other operation of the latch is common. An actuator such as described in U.S. Pat. Nos. 4,364,249, 4,669,283, or 4,978,154, or in German utility model G 86 21 592 filed 12 Oct. 1986 on behalf of Kiekert GmbH can be connected to the lever also so that the latch can be operated remotely. This can be done via a central lock system which simultaneously moves all of the vehicle door latches—whether on passenger doors, the trunk lid, hood, or gas-filler cover—into an unlocked position permitting them to be operated freely from outside the vehicle, or via a simple transmitter/receiver link that whereby a code is transmitted and, when received, the respective latch is unlatched.

These systems are fairly complex and expensive to manufacture. Frequently several elements actuated in different ways do the same job. In general there is a need to rethink how such latches work and provide something that does the same functions but in a simpler manner.

OBJECTS OF THE INVENTION

It is therefore an object of the present invention to provide an improved remotely operable motor-vehicle door latch.

Another object is the provision of such an improved remotely operable motor-vehicle door latch which overcomes the above-given disadvantages, that is which is of simple construction, despite the fact that it can be operated remotely or directly mechanically.

SUMMARY OF THE INVENTION

A motor-vehicle door latch has according to the invention a pivotal fork and a latch element interfittable in a latched position and disengageable from each other in an unlatched position, a latch pawl engageable in a holding position with the fork to retain same in the latched position and disengageable in a releasing position from the fork to allow the fork to move into the unlatched position, and a pawl-actuating lever coupled to the pawl for displacing same between its holding and releasing positions. An inside actuating element and an outside lock cylinder can each displace the pawl between its positions. An actuator connected to the lever and electrically energizable from a rest position to an energized position displaces the pawl from its holding to its releasing position. According to the invention a bistable relay having an input connected to a vehicular power supply and an output is displaceable between a closed position connecting its input and output together and an open position electrically disconnecting its output from its input. An outside actuating switch between the relay output and the actuator closes for electrically energizing the actuator from the power source in the closed position of the relay. A receiver is connected to the relay for displacing same into the closed position on receiving a predetermined signal from a remote transmitter.

The latch according to this invention is therefore specifically designed for a remotely controlled motor-vehicle door latch. The bistable relay effectively makes it impossible to operate the latch, except mechanically via the outside cylinder or internally via the inside actuating element which is an inside door handle for a passenger door or an opening lever for a gas cover or trunk lid. When the bistable relay is in the closed position, however, the latch can be unlatched via its actuator by operating its switch, which can be built into a handle or grip used to open the door so that when first actuated it trips the switch and unlatches the door and afterward serves merely as a handle for manipulating the door.

According to the invention the latch has a housing and the cylinder is mounted in the latch housing. The cylinder is connected to the lever via a bowden cable although it is within the scope of the invention to mount it directly on the latch housing so it can directly actuate the lever. In addition a spring is connected to the actuator for returning the actuator to the rest position after movement into the energized position on interruption of electrical feed to the actuator through the relay and switch.

The relay according to the invention is switchable between its closed and open positions electrically and is stable in both of its positions. A central lock system can be connected to the relay. The latch is normally mounted on a door post and the latch element is mounted on a vehicle door. A bowden cable is connected between the inside actuating element and the lever. Alternately the latch is mounted on a door and the latch element is mounted on a door post.

The actuator here includes an electrical motor carrying a threaded spindle. A nut threaded on the spindle is coupled to the lever. A torque spring coupled to the spindle has an anchored end such that movement of the actuator to displace the lever into its releasing position loads the spring.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
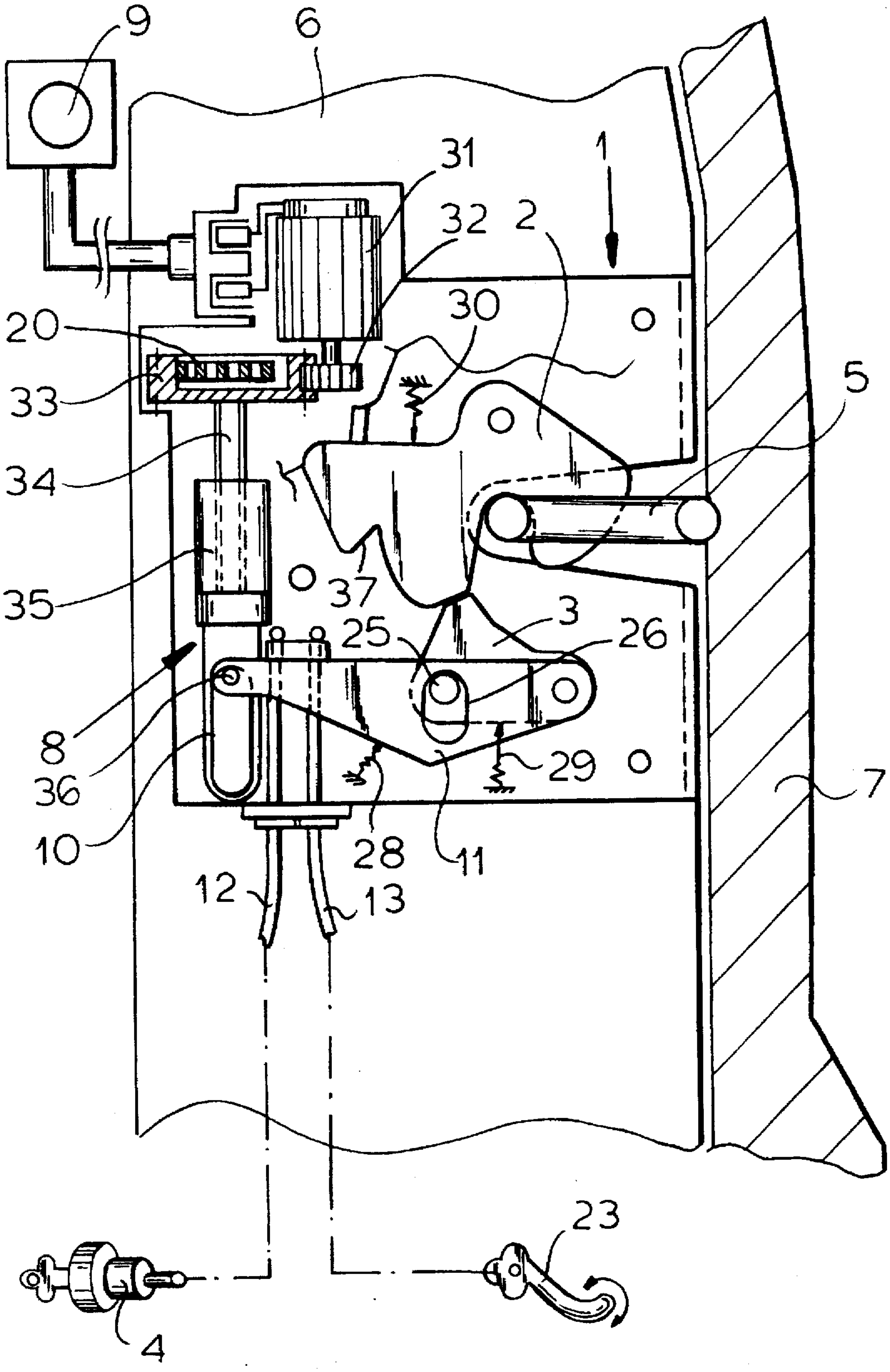
FIG. 1 is a vertical and partly diagrammatic section through the latch according to the invention with the mechanism in the latched and locked positions.
Figure 2:
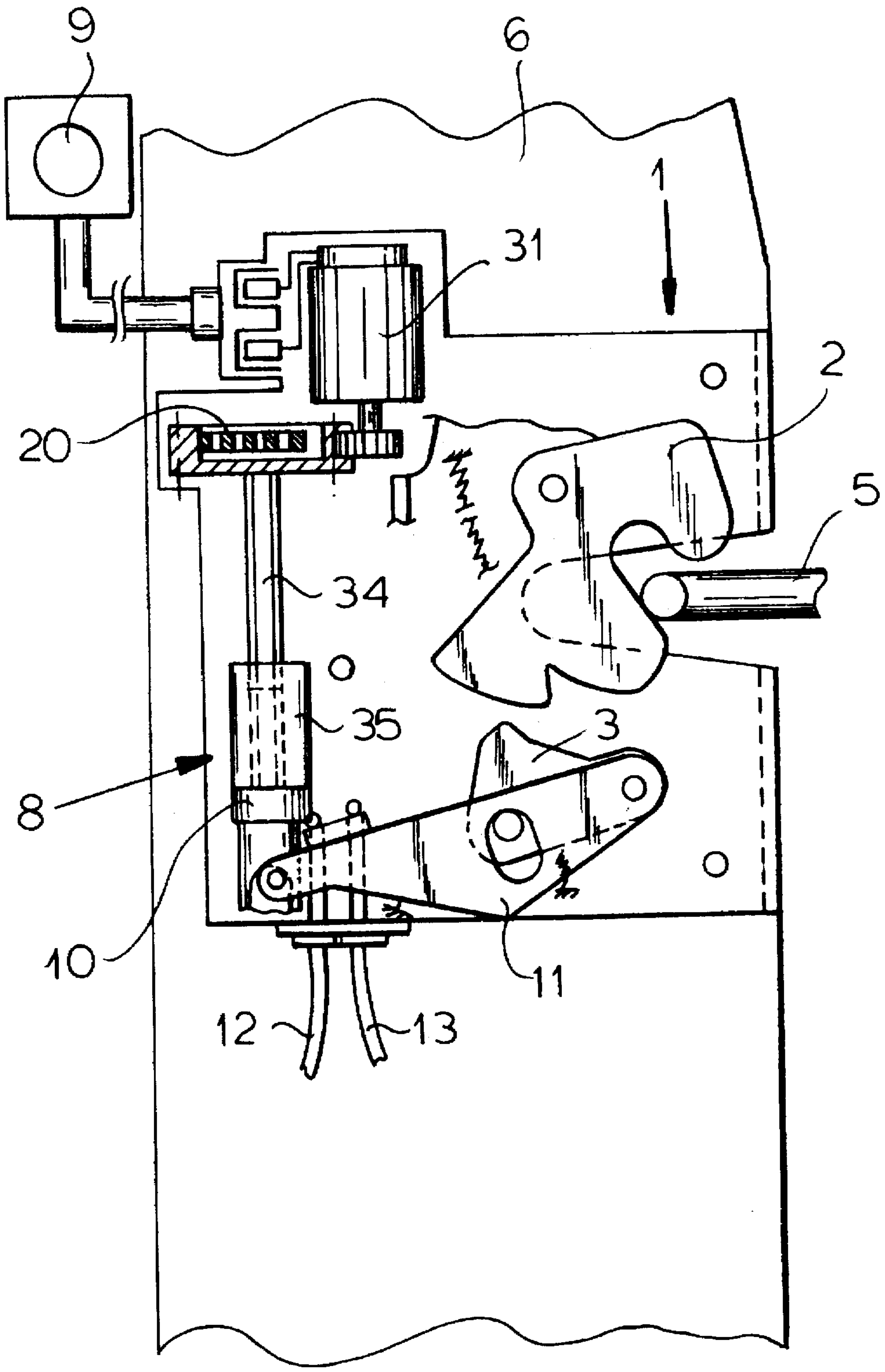
FIG. 2 is a view like FIG. 1 but in the unlatched and unlocked positions.

As seen in FIG. 1 a motor-vehicle latch 1 is mounted on a door post 6 and has a standard pivotal lock fork 2 that can engage and capture a latch element formed by a bolt or eye 5 mounted on a door 7 that can move relative to the post 6. The fork 2 can engage around and secure the eye 5 in place to hold the door 7 closed as shown in FIG. 1 when it is engaged by a standard latching pawl 3 pivotal in the latch 1. When released by the pawl 3, the eye 5 can move out of the latch 1 as shown in FIG. 2. As is standard, the pawl 3 can hold the fork 2 in the fully latched position of FIG. 1 and in a semilatched position engaging in a step 37 of the fork 2.

According to the invention the pawl 3 has a pin 25 seated in a lost-motion slot 26 of a pawl-actuating lever 11 that is mounted on the same pivot 27 as the pawl 3, and that is urged in a clockwise direction by a spring 28, as a spring 29 urges the pawl 3 toward the fork 2. Another spring 30 urges the fork 2 counterclockwise into the FIG. 2 open position. An emergency-actuation bowden cable 12 is connected between this lever 11 and a lock cylinder 4 which can be mounted on the door 7 or on the doorpost 6. In fact the cylinder 4 can act directly, without the intermediary of the cable 12, on the lever 11 when it is mounted right in the latch 1. Another bowden cable 13 connected to the lever 11 leads to an inside actuating handle 23 that may be provided inside the door 7 when same is a standard passenger door, or elsewhere in the vehicle if the door 7 is a trunk lid, gas-filler cover, or hood of the vehicle. Thus it is possible at any time to mechanically operate the latch 1.

An actuator 8 of the type described in the above-cited German utility model is mounted in the latch 1. It comprises an electrical motor 31 having an output gear 32 meshing with a large-diameter gear 33 that in turn carries an output shaft or spindle 34 threaded into a nut 35 formed with an elongated slot 10 in which engages a pin 36 at the end of the lever 11. A torque spring 20 inside the gear 33 is tensioned as this gear 33 is rotated to push down the output element or nut 35.

Figure 3:
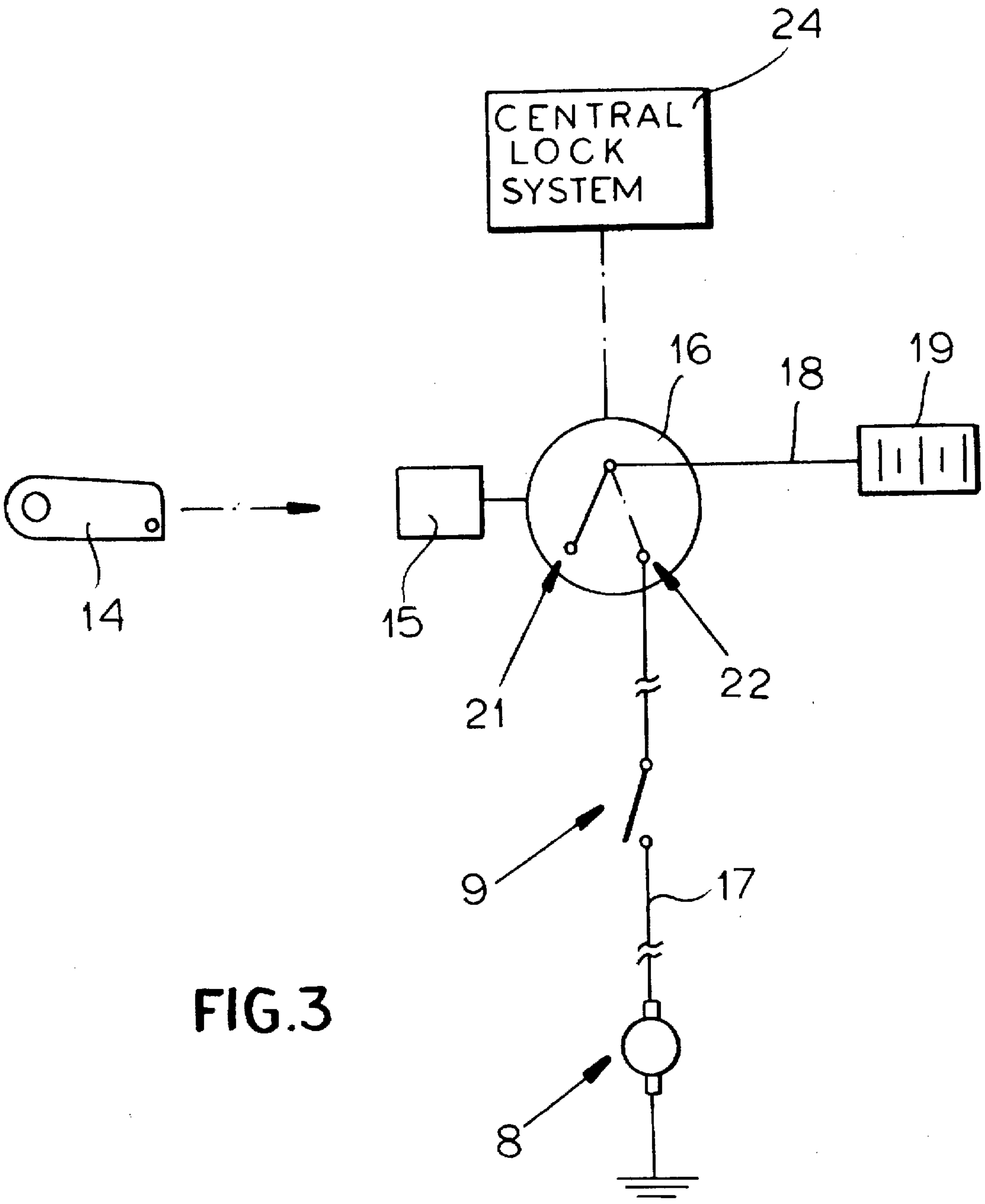
FIG. 3 is a schematic view illustrating the system of this invention.

As also shown in FIG. 3, a power source 19, here the vehicle's battery, is connected via a feed wire 18 to a bistable relay 16 movable between an open position 21 and a closed position 22. In the closed position 22 the relay 16 supplies power via an outside-actuating switch 9 and a wire 17 to the motor 8 to rotate it in a direction pushing down the actuating nut 35.

A remote transmitter 14 of the infrared or UHF type can send a signal to a receiver 15 connected to the relay 16 to switch it to the closed position 22, after which it automatically returns to the open position 21. In addition the relay 16 is connected to a central lock system 24 that can therefore centrally lock or unlock all the vehicle doors.

Thus assuming the relay 16 is in the open position 21, the door can be unlocked by actuating the transmitter 14 to switch this relay 16 to the closed position 22, and then the individual door-opening switch 9 is operated. This switch 9 typically is placed on the door in the position of the normal door handle, and in fact can be operated to unlock the door 7 the instant the handle is grabbed to physically open the door 7.

We claim:

1. A motor-vehicle door latch comprising:

a pivotal fork and a latch element interfittable in a latched position and disengageable from each other in an unlatched position;

a latch pawl engageable in a holding position with the fork to retain same in the latched position and disengageable in a releasing position from the fork to allow the fork to move into the unlatched position;

a pawl-actuating lever coupled to the pawl for displacing same between the holding and releasing positions;

an inside actuating element and means connected between the element and the lever for displacing the pawl between the respective positions;

an outside lock cylinder and means connected, between the cylinder and the lever for displacing the pawl between the respective positions;

an actuator connected to the lever and electrically energizable from a rest position to an energized position for displacing the pawl from the holding to the releasing position;

a bistable relay having an input connected to a vehicular power supply and an output and displaceable between a closed position connecting the input and output together and an open position electrically disconnecting the output from the input;

an outside actuating switch between the relay output and the actuator closable for electrically energizing the actuator from the power source in the closed position of the relay;

a receiver connected to the relay for displacing same into the closed position on receiving a predetermined signal; and a remote transmitter for emitting the predetermined signal.

2. The motor-vehicle door latch defined in claim 1 wherein the means connected between the cylinder and the lever is a bowden cable.

3. The motor-vehicle door latch defined in claim 1, further comprising spring means connected to the actuator for returning the actuator to the rest position after movement into the energized position on interruption of electrical feed to the actuator through the relay and switch.

4. The motor-vehicle door latch defined in claim 1 wherein the relay is switchable between the closed and open positions electrically and is stable in both of the respective positions.

5. The motor-vehicle door latch defined in claim 1, further comprising a central lock system connected to the relay.

6. The motor-vehicle door latch defined in claim 5 wherein the means connected between the cylinder and the lever is a bowden cable.

7. The motor-vehicle door latch defined in claim 1 wherein the latch is mounted on a door post and the latch element is mounted on a vehicle door, the means connected between the inside actuating element and the lever being a bowden cable.

8. The motor-vehicle door latch defined in claim 1 wherein the latch is mounted on a door and the latch element is mounted on a door post.

9. The motor-vehicle door latch defined in claim 1 wherein the actuator includes an electrical motor, a threaded spindle rotatable by the motor, and a nut threaded on the spindle and coupled to the lever.

10. The motor-vehicle door latch defined in claim 9 wherein the actuator further includes a torque spring coupled to the spindle and having an anchored end such that movement of the actuator to displace the lever into the releasing position loads the spring.

* * * * *